US009708484B2

(12) United States Patent
Liu et al.

(10) Patent No.: US 9,708,484 B2
(45) Date of Patent: Jul. 18, 2017

(54) RESIN COMPOSITION AND USES OF THE SAME

(71) Applicant: TAIWAN UNION TECHNOLOGY CORPORATION, Chupei, Hsinchu County (TW)

(72) Inventors: Shur-Fen Liu, Chupei (TW); Meng-Huei Chen, Chupei (TW); Hsin-Ho Wu, Chupei (TW)

(73) Assignee: TAIWAN UNION TECHNOLOGY CORPORATION, Chupei, Hsinchu County (TW)

( * ) Notice: Subject to any disclaimer, the term of this patent is extended or adjusted under 35 U.S.C. 154(b) by 401 days.

(21) Appl. No.: 14/315,827

(22) Filed: Jun. 26, 2014

(65) Prior Publication Data

US 2015/0183987 A1 Jul. 2, 2015

(30) Foreign Application Priority Data

Dec. 31, 2013 (TW) .............................. 102149256 A

(51) Int. Cl.
| | |
|---|---|
| *C08L 71/00* | (2006.01) |
| *C08L 33/06* | (2006.01) |
| *C08L 63/00* | (2006.01) |
| *C08K 3/22* | (2006.01) |
| *C08K 5/5399* | (2006.01) |
| *C08K 3/24* | (2006.01) |
| *C08K 9/02* | (2006.01) |
| *C08K 5/03* | (2006.01) |

(52) U.S. Cl.
CPC .............. *C08L 33/064* (2013.01); *C08K 3/22* (2013.01); *C08K 3/24* (2013.01); *C08K 9/02* (2013.01); *C08K 5/03* (2013.01); *C08K 5/5399* (2013.01); *C08K 2003/2237* (2013.01); *C08K 2201/005* (2013.01); *Y10T 428/31529* (2015.04); *Y10T 428/31678* (2015.04); *Y10T 428/31699* (2015.04)

(58) Field of Classification Search
CPC ... C08K 3/22; C08K 3/24; C08K 9/02; C08K 2003/2237; C08K 2201/005; C08K 5/03; C08K 5/5399; C08L 33/064; Y10T 428/31529; Y10T 428/31678; Y10T 428/31699

USPC ......................................................... 428/418
See application file for complete search history.

(56) References Cited

U.S. PATENT DOCUMENTS

| | | | |
|---|---|---|---|
| 7,700,185 | B2 | 4/2010 | Kumashiro |
| 2004/0147658 | A1 | 7/2004 | Matsushima |
| 2009/0170993 | A1 | 7/2009 | Liu |
| 2011/0024172 | A1 | 2/2011 | Maruyama et al. |
| 2013/0180770 | A1 | 7/2013 | Su |
| 2015/0313012 | A1 | 10/2015 | Chen et al. |

FOREIGN PATENT DOCUMENTS

| | | | |
|---|---|---|---|
| CN | 102161823 A | 8/2011 | |
| CN | 102993683 A | 3/2013 | |
| EP | 2927281 * | 7/2015 | .............. C08L 71/12 |
| TW | 200950632 A | 12/2009 | |

OTHER PUBLICATIONS

Sintering and Dielectric Properties of Hydrothermally Synthesized Cubic and Tetragonal BaTiO3 Powders, Jpn. J. Appl. Phys. vol. 36 (1997) pp. 214-221; Part 1, No. IA, Jan. 1997.*
Chinese Office Action corresponding to Patent Application No. 201410011210.0; Date of Mailing: Jun. 24, 2016.
Taiwanese Office Action corresponding to Application No. 102149256 ; Date of Mailing: Dec. 11, 2014; no English translation.

* cited by examiner

*Primary Examiner* — Ling Choi
*Assistant Examiner* — Chun-Cheng Wang
(74) *Attorney, Agent, or Firm* — Cantor Colburn LLP

(57) ABSTRACT

A resin composition is provided. The resin composition includes a thermosetting resin component and a filler, wherein the thermosetting resin component has a dissipation factor (Df) of not higher than 0.006 at 1 GHz, and the filler is selected from the following group: strontium titanate, calcium titanate, barium titanate, magnesium titanate, combinations thereof and the sintered material of any of the combinations. The filler is doped or not doped with one or more elements selected from silicon, cobalt, nickel, manganese, and rare earth elements. The average particle size ($D_{50}$) of the filler ranges from about 2 μm to about 10 μm. The amount of the filler is about 10 parts by weight to about 600 parts by weight per 100 parts by weight of the thermosetting resin component.

14 Claims, 2 Drawing Sheets

High Dk filler       Particle size distribution:
SrTiO$_3$        $D_{50}$: 2.81      $D_{90}$: 3.7 (unit: µm)

RESIN COMPOSITION AND USES OF THE SAME

CROSS-REFERENCES TO RELATED APPLICATIONS

The present invention claims priority under 35 U.S.C. §119 to Taiwanese Patent Application No. 102149256, filed on Dec. 31, 2013, the entire content of which is incorporated herein by reference.

BACKGROUND OF THE INVENTION

Field of the Invention

The present invention relates to a resin composition and a prepreg and laminate prepared using the same. Specifically, the present invention relates to a resin composition useful for preparing a laminate with a high dielectric constant (Dk) and low dielectric loss.

Descriptions of the Related Art

Printed circuit boards (PCBs) are circuit substrates that are used for electronic devices to load other electronic components and to electrically connect the components to provide a stable circuit working environment. One kind of conventional printed circuit board is a copper clad laminate (CCL), which is primarily composed of resin(s), reinforcing material(s) and copper foil(s). Conventional resins include epoxy resins, phenolic resins, polyamine formaldehyde resins, silicone resins or polytetrafluoroethylene resins. Conventional reinforcing materials include glass fiber cloths, glass fiber mats, insulating papers or linen cloths.

In general, a print circuit board can be prepared by using the following methods: immersing a reinforcing material, such as glass fiber fabric into a resin (e.g. epoxy resin), and curing the immersed glass fiber fabric into a half-hardened state to obtain a prepreg; superimposing certain layers of the prepregs and superimposing a metal foil on at least one external surface of the superimposed prepregs to provide a superimposed object; hot-pressing the superimposed object to obtain a metal clad laminate; etching the metal foil on the surface of the metal clad laminate to form a defined circuit pattern; and finally, drilling a plurality of holes on the metal clad laminate and plating these holes with a conductive material to form via holes to accomplish the preparation of the printed circuit board.

As the size of the electronic devices becomes smaller, PCBs must be thinned and made more densely to include much more active and passive components. In view of this, component-functional areas must be formed within a laminate to allow for more freedom in the circuit design. A radio frequency (RF) field especially requires highly dense PCBs. This is because the use of a laminate with excellent electrical properties (high dielectric constant and low dielectric loss) to incorporate a passive component into the laminate will allow a general radio frequency modules and digital system to be incorporated into one single PCB. Unfortunately, the dielectric loss of a laminate prepared by epoxy resin is still high (Df is high), and the dielectric constant (Dk) of the laminate also fails to meet the requirements of a capacitor material. As a result, the industry has been trying to develop a dielectric material which is low-cost, but has excellent electrical properties (high Dk and low Df).

TW 200927806 discloses a low dielectric loss composition for a flexible substrate, which improves the dielectric constant of the composition by adding ceramic powders of strontium titanate ($SrTiO_3$) and/or barium strontium titanate ($BaSrTiO_3$) with a particle size ranging from 30 nm to 2 μm. However, the improvement is very limited.

US 2004147658 discloses a composition for the formation of a built-in capacitor layer of a printed wiring board, which includes a dielectric powder with a particle size ranging from 0.1 μm to 2 μm, such as barium titanate ($BaTiO_3$) and strontium titanate ($SrTiO_3$). The composition is still prepared based on an epoxy resin system. The dielectric loss (Df) is therefore still high.

U.S. Pat. No. 7,700,185 discloses an insulation composite material, which is primarily composed of a filler with a high dielectric constant and insulation resin (mostly epoxy resin). The filler must be a ceramic powder with a bimodal particle size distribution. A dispersant must be used to help disperse the powder. As can be seen from the illustrated examples, the insulation composite material still has a high Df (up to 0.02).

In view of this, the present invention provides a resin composition which does not require a dispersant and is useful in preparing a laminate with a low Df value and high dielectric constant.

SUMMARY OF THE INVENTION

One objective of the present invention is to provide a resin composition, comprising: a thermosetting resin component, having a dissipation factor (Df) of not higher than 0.006 at 1 GHz; and a filler, selected from the group consisting of strontium titanate, calcium titanate, barium titanate, magnesium titanate, and combinations thereof, and sintered material of any one of the previous combinations; wherein, the filler is doped or not doped with at least one of silicon (Si), cobalt (Co), nickel (Ni), manganese (Mn), and rare earth elements; the filler has an average particle size ($D_{50}$) that ranges from about 2 μm to about 10 μm and a unimodal particle size distribution; and the amount of the filler is about 10 parts by weight to about 600 parts by weight per 100 parts by weight of the thermosetting resin component.

Another objective of the present invention is to provide a prepreg, which is prepared by immersing a substrate into the resin composition that is described above, and drying the immersed substrate.

Another objective of the present invention is to provide a laminate, comprising a synthetic layer and a metal layer, wherein the synthetic layer is made from the prepreg as mentioned above.

To render the above objectives, technical features and advantages of the present invention more apparent, the present invention will be described in detail with reference to some embodiments hereinafter.

DESCRIPTION OF THE PREFERRED EMBODIMENT

Figure 1:
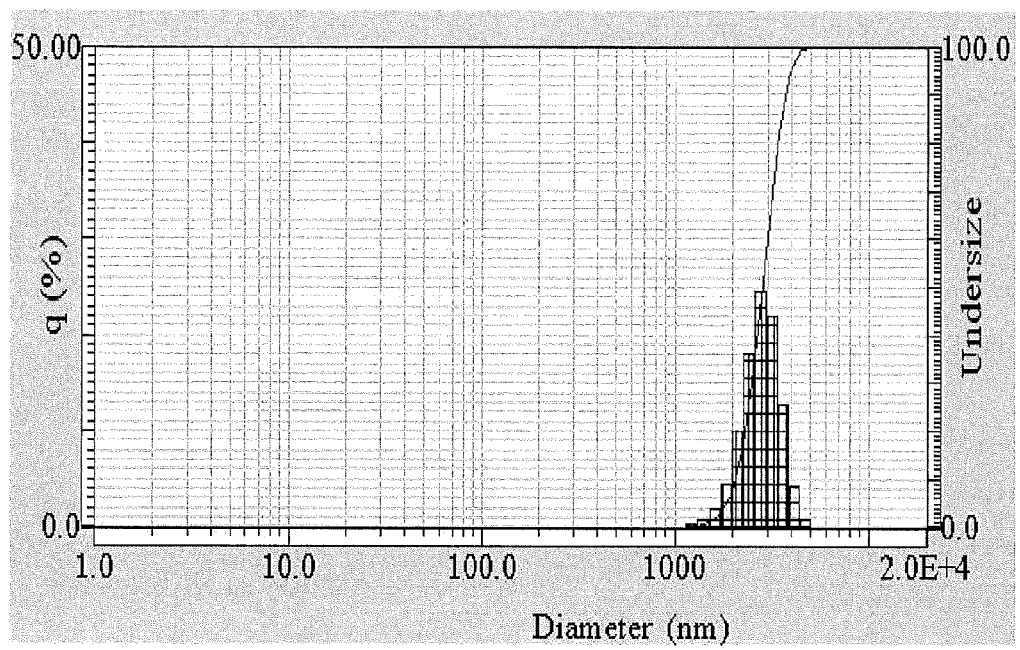
FIG. 1 shows the distribution diagram and average particle size ($D_{50}$) of the strontium titanate used in Example 1.

Hereinafter, some embodiments in accordance with the present invention will be described in detail. However, without departing from the spirit of the present invention, the present invention may be applied to various embodiments. The scope of the present invention shall not be considered to be limited to what is illustrated herein. Furthermore, unless it is additionally explained, the expressions "a", "the", or the like recited in the specification of the present invention (especially in the claims) should include both the singular and plural forms. Unless it is additionally explained, when describing the components in the solution, mixture, and composition in the specification, the amount of each constituent is counted based on the solid content, i.e., disregarding the weight of the solvent.

In an embodiment of the present invention, a resin composition for the preparation of laminate is provided. The resin composition comprises a thermosetting resin composition and a filler. The laminate prepared using the resin composition is provided with a high dielectric constant (high Dk) and low dielectric loss (low Df). Its high dielectric constant property could provide a better polarizing effect and its low dissipation factor property at high frequency is especially suitable for a high frequency print circuit board field (e.g., the radio frequency field) for forming a passive component such as a capacitor component.

Specifically, in another embodiment of the present invention, the resin composition comprises a thermosetting resin component and a filler, wherein the thermosetting resin component has a dissipation factor (Df) that is not higher than 0.006 at 1 GHz, and the filler is selected from a group consisting of strontium titanate, calcium titanate, barium titanate, magnesium titanate, combinations thereof, and sintered material of any one of the previous combinations. The ratio of the amount between the filler and the thermosetting resin component is not particularly limited and may be adjusted depending on the needs of the user. In general, the amount of filler is about 10 parts by weight to about 600 parts by weight per 100 parts by weight of the thermosetting resin component, and preferably, about 50 parts by weight to about 400 parts by weight per 100 parts by weight of the thermosetting resin component.

"Thermosetting resin" refers to a polymer that can be gradually cured by forming a network structure through a heat treatment. In some embodiments of the present invention, the thermosetting resin component of the resin composition may be a single thermosetting resin or a mixture of multiple thermosetting resins. Regardless of using a single thermosetting resin or a mixture of multiple thermosetting resins, the Df value of the finally obtained thermosetting resin component must not be higher than 0.006 at 1 GHz.

In some embodiments of the present invention, the thermosetting resin component of the resin composition may be provided by a thermosetting resin selected from the group consisting of a polyphenyleneoxide (PPO) resin with one or more reactive functional groups, copolymers or oligomers of styrene with one or more reactive functional groups, and copolymers or oligomers of butadiene with one or more reactive functional groups, or a combination thereof Alternatively, the thermosetting resin component may be provided by combining at least one of the above thermosetting resins with other known thermosetting resins, such as epoxy resin; however, in this case, the Df value of the thermosetting resin component cannot be higher than 0.006 at 1 GHz. Examples of polyphenyleneoxide resin with one or more reactive functional groups include but are not limited to a polyphenyleneoxide resin with an acrylic acid group, a polyphenyleneoxide resin with a vinyl group, and a polyphenyleneoxide resin with a carboxyl group. Examples of the copolymers or oligomers of styrene with one or more reactive functional groups include but are not limited to a copolymer of styrene maleic anhydride (SMA). Examples of the copolymers or oligomers of the butadiene with one or more reactive functional groups include but are not limited to polybutadiene, butadiene and styrene copolymer etc. Examples of the epoxy resin include but are not limited to bisphenol A-type phenolic epoxy resin, bisphenol F-type phenolic epoxy resin, brominated epoxy resin, cycloaliphatic epoxy resin, naphthalene-containing epoxy resin, or bisphenylidene epoxy resin. Furthermore, the "reactive functional group" in the context may be any group capable of conducting a curing reaction. For example, the reactive functional group may be a hydroxyl group, carboxyl group, alkenyl group, amino group, acid anhydride group, or maleic anhydride group, but is not limited thereto.

In an embodiment of the resin composition of the present invention, the filler is a ceramic powder with a high Dk value. The Df value of the ceramic powder is preferably not higher than 0.008. In another embodiment, the ceramic powder is preferably sintered at a high temperature (at least 1100° C.) to obtain a filler with a lower Df value (the Df value of ceramic powder will be lowered after being sintered at a high temperature). Without being restricted by any theories, it is believed that a ceramic powder with a very small particle size (for example a particle size lower than 2 μm) will not be able to provide a significant improvement in the Dk. Therefore, in an embodiment of the present invention, the average particle size of a filler of the resin composition is preferably about 2 μm to about 10 μm and more preferably about 2.5 μm to about 6 μm. Additionally, to obtain a product with a uniform electrical property, the average particle size of the filler is preferably in a unimodal distribution.

Examples of a filler suitable for the resin composition of the present invention include a ceramic powder with a lattice structure of perovskite or pseudo perovskite, for example, but not limited to, strontium titanate ($SrTiO_3$), calcium titanate ($CaTiO_3$), barium titanate ($BaTiO_3$), magnesium titanate ($MgTiO_3$), the combinations thereof, and/or a sintered material of any one of the prior combinations. Examples of said sintered material includes strontium calcium titanate ($SrCaTiO_3$), strontium barium titanate ($SrBaTiO_3$), etc. In addition, the ceramic powder may be further doped with at least one of silicon (Si), cobalt (Co), nickel (Ni), manganese (Mn), and rare earth elements. For example, NPO ceramic powder is an example of the doped ceramic powder known in the art.

The resin composition of the present invention may optionally comprise other additives, such as a hardening promoter, a dispersing agent, a flexibilizer, a flame retardant, a release agent, etc. Those additives may be taken alone or in combination. For example, a phosphorous-containing flame retardant or a bromine-containing flame retardant (such as 1,2-bis(pentabromophenyl)ethane), but not limited thereto, may be added to enhance the flame retardance of the product. Alternately, a hardening promoter selected from the group consisting of the following components may also be added to provide an improved hardening effect: benzoyl peroxide (BPO), imidazole (MI), 2-methylimidazole (2MI) and 2-ethyl-4-methylimidazole (2E4MI), 2-phenylimidazole (2PI). The amount of those additives may be adjusted depending on the needs of persons with ordinary skills in the art based on the disclosure of the specification, and is not specifically limited.

The resin composition of the present invention may be prepared into varnish form by evenly mixing the thermosetting resin component and the filler through a stirrer and dissolving or dispersing the mixture into a solvent for subsequent applications. The solvent may be any inert solvent which can be dissolved or dispersed but not react with the components of the resin composition of the present invention. For example, the solvent which can dissolve or disperse the resin composition of the present invention includes, but is not limited to, methyl ethyl ketone (MEK), γ-butyrolactone, toluene, cyclohexanone, propanone, xylene, methyl isobutyl ketone, N,N-dimethyl formamide (DMF), N,N-dimethyl acetamide (DMAc), N-methyl-pyrolidone (NMP), and mixtures thereof The amount of the solvent is not particularly limited as long as the components of the resin composition can be mixed evenly. In some embodiments in the present invention, a mixture of methyl ethyl ketone and γ-butyrolactone is used as the solvent.

The present invention further provide a prepreg which is obtained by immersing a substrate (reinforcing materials) into the resin composition mentioned above, and drying the immersed substrate. A conventional reinforcing material includes a glass fiber cloth (a glass fabric, a glass paper, a glass mat, etc.), a kraft paper, a short fiber cotton paper, a nature fiber cloth, an organic fiber cloth, etc. In some embodiments of the present invention, a 2116 reinforced glass fiber cloth is illustrated as the reinforcing material, which is coated with the resin composition and then heated and dried at 175° C. for 2 to 15 minutes to provide a half-hardened prepreg.

The abovementioned prepreg can be used for manufacturing a laminate. Thus, the present invention further provides a laminate comprising a synthetic layer and a metal layer, wherein the synthetic layer is made from the above prepreg. The laminate may be prepared by the following process: superimposing a plurality of prepregs and superimposing a metal foil (such as a copper foil) on at least one external surface of the superimposed prepregs to provide a superimposed object; performing a hot-pressing operation onto the superimposed object to obtain the laminate. Moreover, a printed circuit board can be obtained by further making a pattern on the metal foil of the laminate.

The present invention will be further illustrated by the embodiments hereinafter, wherein, the measuring instruments and methods are respectively as follows:

[Solder Resistance Test]
The solder resistance test is carried out by immersing the dried laminate in a solder bath at 288° C. for awhile and observing whether there is any defect such as delamination and expansion.

[Peeling Strength Test]
The peeling strength refers to the bonding strength between a metal foil and a laminated prepreg, which is usually expressed by the force required for vertically peeling the clad copper foil with a width of ⅛ inch from the surface of the laminated prepreg.

[Glass Transition Temperature Test]
The glass transition temperature (Tg) is measured by using a Differential Scanning calorimeter (DSC), wherein the measuring methods are IPC-TM-650.2.4.25C and 24C testing method of the Institute for Interconnecting and Packaging Electronic Circuits (IPC).

[Flame Retardance Test]
The flame retardance test is carried out according to UL94V (Vertical Burn), which comprises the burning of a laminate, which is held vertically, using a Bunsen burner to compare its self-extinguishing properties and combustion-supporting properties.

[Dielectric Constant and Dissipation Factor Measurement]
Dk and Df are measured according to ASTM D150 under an operating frequency of 1 GHz.

[Particle Size Distribution and Average Particle Size Measurement]
The particle size distribution and average particle size ($D_{50}$) are measured according to dynamic light scattering (DLS) method using a HORIBA LB-550 DLS analyzer.

EXAMPLES

[Preparation of the Resin Composition]

Example 1

According to the ratio shown in Table 1, epoxy resin (ChangChun Group) and SMA resin (Cray Valley) as the thermosetting resin component, imidazole (Schikoku) as a catalyst, 1,2-bis(pentabromophenyl) ethane (Albemarle, SAYTEX 8010) as a retardant, the strontium titanate powder with an average particle size ($D_{50}$) of 2.8 μm in an unimodal distribution as shown in FIG. 1 (Superrite Co., Ltd.) as a filler were mixed under room temperature with a stirrer for about 60 minutes, followed by adding methyl ethyl ketone and γ-butyrolactone (both Fluka Co.) thereinto. After stirring under room temperature for about 120 minutes, a resin composition 1 was obtained.

Example 2

The preparation procedures of Example 1 were repeated to prepare a resin composition 2, except that a mixture of strontium titanate powder and NPO ceramic powder (Prosperity Dielectrics Co.) was used as the filler and the amounts of epoxy resin and SMA resin were adjusted as shown in Table 1.

Example 3

According to the ratio shown in Table 1, epoxy resin (ChangChun Group) and polyphenyleneoxide resin with acrylic groups (Sabic Co.) as the thermosetting resin component, benzoyl peroxide (Fluka Co.) and imidazole as a catalyst, 1,2-bis(pentabromophenyl)ethane as a retardant, calcium strontium titanate powder with an average particle size ($D_{50}$) of 2.8 μm (Superrite Co., Ltd.) as a filler were mixed under room temperature with a stirrer for about 60 minute, followed by adding methyl ethyl ketone and γ-butyrolactone thereinto. After stirring the resultant mixture under room temperature for about 120 minutes, a resin composition 3 was obtained.

Example 4

The preparation procedures of Example 3 were repeated to prepare a resin composition 4, except that a mixture of epoxy resin and polyphenyleneoxide resin with hydroxyl groups (Sabic Co.) was used as the thermosetting resin component, a phosphorus-containing flame retardant (SPB100, Otsuka Chemical Co. Ltd.) was used as the retardant, and calcium strontium titanate powder with an average particle size ($D_{50}$) of 2.8 μM was used as the filler. The amounts of these components were adjusted as shown in Table 1.

Example 5

According to the ratio shown in Table 1, a polyphenyleneoxide resin with acrylic groups as the thermosetting resin component, benzoyl peroxide as a catalyst, 1,2-bis(pentabromophenyl)ethane as a retardant, calcium strontium titanate powder with an average particle size ($D_{50}$) of 2.8 μm (Superrite Co., Ltd.) as a filler were mixed under room temperature with a stirrer for about 60 minutes, followed by adding methyl ethyl ketone and γ-butyrolactone thereinto. After stirring the resultant mixture under room temperature for about 120 minutes, a resin composition 5 was obtained.

Example 6

The preparation procedures of Example 5 were repeated to prepare a resin composition 6, except that a mixture of polyphenyleneoxide resin with acrylic groups and SMA resin was used as the thermosetting resin component, a mixture of strontium titanate powder with an average particle size ($D_{50}$) of 2.8 μm and calcium strontium titanate powder with an average particle size ($D_{50}$) of 2.8 μm was used as the filler, and the amounts of the catalyst and the retardant were adjusted as shown in Table 1.

Example 7

Figure 2:
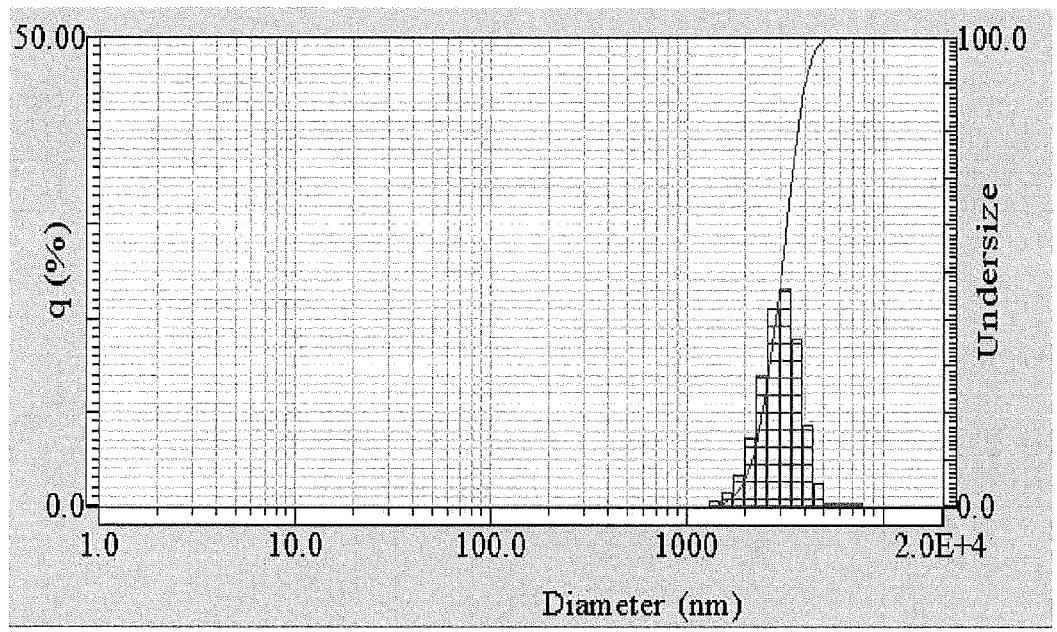
FIG. 2 shows the distribution diagram the average particle size ($D_{50}$) of a mixture of strontium titanate and barium titanate used in Example 7.

The preparation procedures of Example 5 were repeated to prepare a resin composition 7, except that a mixture of the polyphenyleneoxide resin with acrylic groups and a resin containing butadiene (Ricon 100®, Cray Valley Co.) was used as the thermosetting resin component, a mixture of barium titanate powder with an average particle size ($D_{50}$) of 3.0 μm and calcium strontium titanate powder with an average particle size ($D_{50}$) of 3.0 μm in an unimodal distribution as shown in FIG. 2 (Prosperity Dielectrics Co.) was used as the filler, and the amounts of the catalyst and the retardant were adjusted as shown in Table 1.

Example 8

The preparation procedures of Example 5 were repeated to prepare a resin composition 8, except that a mixture of the polyphenyleneoxide resin with acrylic groups and a resin containing butadiene was used as the thermosetting resin component, and the amounts of the catalyst, the retardant and the filler were adjusted as shown in Table 1.

Example 9

The preparation procedures of Example 5 were repeated to prepare a resin composition 9, except that polyphenyleneoxide resin with alkenyl groups (Sabic Co.) was used as the thermosetting resin component, the NPO ceramic powder was used as the filler, and the amount of the catalyst was adjusted as shown in Table 1.

Comparative Example 1

The preparation procedures of Example 1 were repeated to prepare a comparative resin composition 1, except that epoxy resin was used as the thermosetting resin component and barium titanate powder with an average particle size ($D_{50}$) of 2.8 μm was used as the filler as shown in Table 1.

Comparative Example 2

The preparation procedures of Comparative Example 1 were repeated to prepare a comparative resin composition 2, except that a mixture of the barium titanate powder with an average particle size ($D_{50}$) of 3.0 μm and strontium titanate powder with an average particle size ($D_{50}$) of 3.0 μm was used as the filler as shown in Table 1.

TABLE 1

| Parts by weight | | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|---|
| Thermosetting resin | Epoxy resin | | 30 | 20 | 30 | 20 | | | | | | 60 | 60 |
| | Polyphenylene oxide resin | Acrylic group | | | 30 | | 60 | 50 | 50 | 50 | | | |
| | | Alkenyl group | | | | | | | | | 60 | | |
| | | Hydroxyl group | | | | 40 | | | | | | | |
| | SMA resin | | 30 | 40 | | | | 10 | | | | | |
| | Resin containing butadiene | | | | | | | | 10 | 10 | | | |
| Catalyst | Benzoyl peroxide | | | | 0.3 | | 0.6 | 0.7 | 0.8 | 0.8 | 0.5 | | |
| | Imidazole | | 0.5 | 0.5 | 0.5 | 0.4 | | | | | | 0.5 | 0.5 |
| retardant | SAYTEX 8010 | | 11 | 11 | 11 | | 10 | 11 | 12 | 12 | 10 | 11 | 11 |
| | SPB100 | | | | | 18 | | | | | | | |
| filler | barium titanate | | | | | | | | | 40 | | 90 | 45 |
| | strontium titanate | | 110 | 60 | | | | 40 | | | | | 45 |
| | calcium strontium titanite | | | | 30 | 110 | 110 | 70 | 70 | 220 | | | |
| | NPO ceramic powder | | | 50 | | | | | | | 100 | | |

[Preparation of the Laminate]

The laminates were prepared using resin compositions 1 to 9 and comparative resin compositions 1 to 2, respectively. In detail, one of those resin compositions was coated on 2116 reinforced glass fiber cloths by a roller. The coated 2116 reinforced glass fiber cloths were then placed in an oven and dried at 175° C. for 2 to 15 minutes to produce prepregs in a half-hardened state. Four pieces of the prepregs were superimposed and two sheets of copper foil (0.5 oz.) were respectively superimposed on the two external surfaces of the superimposed prepregs to provide a superimposed object. A hot-pressing operation was performed on each of the prepared objects to provide laminates 1 to 9 (corresponding to resin compositions 1 to 9) and comparative laminates 1 to 2 (corresponding to comparative resin compositions 1 to 2). Herein, the hot-pressing conditions are as follows: raising the temperature to about 200° C. to 220° C. with a heating rate of 1.0 to 3.0° C./min, and hot-pressing for 180 minutes under the full pressure of 15 kg/cm² (initial pressure is 8 kg/cm²) at said temperature.

The solder resistance, peeling strength, flame retardance, glass transition temperature (Tg), dielectric constant (Dk), and dissipation factor (Df) of laminates 1 to 9 and comparative laminates 1 to 2 were analyzed and the results are tabulated in Table 2.

TABLE 2

|  | unit | Example 1 | Example 2 | Example 3 | Example 4 | Example 5 | Example 6 | Example 7 | Example 8 | Example 9 | Comparative example 1 | Comparative example 2 |
|---|---|---|---|---|---|---|---|---|---|---|---|---|
| solder resistance | minute | >10 | >10 | >10 | >10 | >10 | >10 | >10 | >10 | >10 | >10 | >10 |
| peeling strength | pound/inch | >5 | >5 | >5 | >5 | >5 | >5 | >5 | >5 | >5 | >5 | >5 |
| glass transition temperature (Tg) | °C. | 168 | 160 | 180 | 170 | 189 | 176 | 172 | 185 | 186 | 173 | 172 |
| flame retardance (UL 94) | grade | 94V0 | 94V0 | 94V0 | 94V0 | 94V0 | 94V0 | 94V0 | 94V0 | 94V0 | 94V0 | 94V0 |
| dielectric constant (Dk) | 1 GHz | 8.2 | 7.5 | 5.1 | 5.6 | 7.7 | 7.9 | 8.1 | 10.5 | 5.9 | 11 | 8.9 |
| dissipation factor (Df) | 1 GHz | 0.0055 | 0.0050 | 0.0047 | 0.0067 | 0.0033 | 0.0035 | 0.0062 | 0.0031 | 0.0029 | 0.018 | 0.011 |

As shown in Table 2, laminates 1 to 9 manufactured by using the resin compositions of the present invention are provided with satisfactory physicochemical properties and heat resistance (such as peeling strength, flame retardance, and Tg), outstanding dielectric properties (high value of Dk) and low dielectric loss (low Df), and therefore, conform to the needs of the radio frequency (RF) field. In particular, Examples 5, 6 and 8 further indicate that the electrical properties of the laminates are even better (higher Dk and lower Df values) when using polyphenyleneoxide resin, a combination of polyphenyleneoxide resin and SMA resin or a combination of polyphenyleneoxide resin and the resin containing butadiene as the thermosetting resin component, and using calcium strontium titanate as the filler. In contrast, the dielectric loss of comparative laminates 1 and 2 prepared using merely epoxy resin as the thermosetting resin component is much higher.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A resin composition, comprising:
   a thermosetting resin component, having a dissipation factor (Df) of not higher than 0.006 at 1 GHz; and
   a filler, selected from the group consisting of strontium titanate, calcium titanate, barium titanate, magnesium titanate, combinations thereof, and sintered material of any one of the combinations,
   wherein, the filler is doped or not doped with at least one of silicon (Si), cobalt (Co), nickel (Ni), manganese (Mn), and rare earth elements; the filler has an average particle size ($D_{50}$) ranging from about 2 μm to about 10 μm and an unimodal particle size distribution; and the amount of the filler is about 10 parts by weight to about 600 parts by weight per 100 parts by weight of the thermosetting resin component.

2. The resin composition of claim 1, wherein the thermosetting resin component comprises a thermosetting resin selected from the group consisting of polyphenyleneoxide (PPO) resins having one or more reactive functional groups, copolymers or oligomers of styrene having one or more reactive functional groups, copolymers or oligomers of butadiene having one or more reactive functional groups, and combinations thereof.

3. The resin composition of claim 2, wherein the thermosetting resin component comprises polyphenyleneoxide resin having one or more reactive functional groups and a thermosetting resin selected from the group consisting of copolymers or oligomers of styrene having one or more reactive functional groups, copolymers or oligomers of butadiene having one or more reactive functional groups, and combinations thereof.

4. The resin composition of claim 2, wherein the thermosetting resin component further comprises epoxy resin.

5. The resin composition of claim 2, wherein the thermosetting resin component is a polyphenyleneoxide resin having one or more reactive functional groups.

6. The resin composition of claim 2, wherein the reactive functional group is selected from the group consisting of hydroxyl group, carboxyl group, alkenyl group, amino group, acid anhydride group and maleic anhydride group.

7. The resin composition of claim 1, wherein the filler is sintered at 1100° C. or a higher temperature.

8. The resin composition of claim 1, wherein the thermosetting resin composition comprises epoxy resin.

9. The resin composition of claim 1, wherein the amount of the filler is about 50 parts by weight to about 400 parts by weight per 100 parts by weight of the thermosetting resin component.

10. The resin composition of claim 1, wherein the average particle size of the filler is about 2.5 µm to about 6 µm.

11. The resin composition of claim 1, which further comprises an additive selected from the group consisting of a hardening promoter, a dispersing agent, a flexibilizer, a retardant, a release agent, and combinations thereof.

12. The resin composition of claim 11, wherein the retardant is a bromine- containing flame retardant, a phosphorus-containing flame retardant, or a combination thereof and the hardening promoter is selected from the group consisting of benzoyl peroxide (BPO), imidazole (MI), 2-methylimidazole (2MI), 2-ethyl-4-methylimidazole (2E4MI), 2-phenylimidazole (2PI), and combinations thereof.

13. A prepreg, which is prepared by immersing a substrate into the resin composition of claim 1, and drying the immersed substrate.

14. A laminate, comprising a synthetic layer and a metal layer, wherein the synthetic layer is made from the prepreg of claim 13.

* * * * *